United States Patent [19]

Bar-Joseph

[11] Patent Number: 4,858,243
[45] Date of Patent: Aug. 15, 1989

[54] LASER PUMPING CAVITY

[75] Inventor: Dan Bar-Joseph, Ashdod, Israel

[73] Assignee: Raycon Corporation, Ann Arbor, Mich.

[21] Appl. No.: 60,827

[22] Filed: Jun. 12, 1987

[51] Int. Cl.[4] .............................................. H01S 3/093
[52] U.S. Cl. ............................. 372/72; 372/35; 372/80
[58] Field of Search .................. 372/34, 35, 72, 69, 372/80

[56] References Cited

U.S. PATENT DOCUMENTS

| | | | |
|---|---|---|---|
| 3,555,449 | 1/1971 | Osial et al. | 372/72 |
| 3,600,702 | 8/1971 | De Benedictis | 372/72 |
| 3,611,189 | 10/1971 | Stone et al. | 372/35 |
| 3,659,220 | 4/1972 | Erickson | 372/35 |
| 3,702,976 | 11/1972 | Young | 372/70 |
| 3,979,696 | 9/1976 | Buchman | 372/72 |
| 4,207,541 | 6/1980 | Karger et al. | 372/35 |
| 4,232,276 | 11/1980 | Iwata | 372/35 |
| 4,506,369 | 3/1985 | Houston | 372/35 |
| 4,637,028 | 1/1987 | Kahan | 372/34 |
| 4,730,324 | 3/1988 | Azad | 372/72 |
| 4,769,823 | 9/1988 | Dubé | 372/80 |
| 4,802,186 | 1/1989 | Gibson et al. | 372/92 |

FOREIGN PATENT DOCUMENTS 2932204  2/1981  Fed. Rep. of Germany ........ 372/72

Primary Examiner—William L. Sikes
Assistant Examiner—Xuan Thi Vo
Attorney, Agent, or Firm—John C. Evans

[57] ABSTRACT

A glass ceramic reflector having a uniform material composition which has an almost 100% reflectivity that is diffusive in the reflectance range of the entire solar spectrum from 450 to 900 nm wavelength. Furthermore, the ceramic material has a high absorption of ultraviolet wave lengths and low reflectivity in the infrared region to minimize thermal loading of the laser rod of high gain laser material. In one preferred embodiment, the glass ceramic reflector is mica based and has a composition of approximately 55% crystal and 45% residual glass, thereby defining a microstructure that enables the ceramic material to be machined to form an interior surface configuration that is easily closely coupled to flashlamp and laser rod components of the laser device.

15 Claims, 1 Drawing Sheet

LASER PUMPING CAVITY

TECHNICAL FIELD

This invention relates to laser devices and more particularly to optically pumped lasers having diffuse reflectors.

Lasers have utilized a pumping cavity with a surface which diffusively reflects photons from a flashlamp which is optically coupled to a rod of laser material as set forth in U.S. Pat. No. 3,979,696, issued Sept. 7, 1976, to Buchman. In the Buchman arrangement, the diffusivity material is in the form of a coating of sodium silicate mixed with samarium oxide to form a coating consistency in the order of house paint. The coating material is painted over an inner or outer surface of a transparent material such as fused quartz or borosilicate glass to form a thickness which will diffusively reflect the pumping radiation from the flashlamp so as to uniformly illuminate the exposed surface of a laser rod. The coatings are applied to housing members by being painted over the outer lateral surfaces thereof and allowed to dry. The coating is applied in incremental layers, each of which must not exceed about 5 mils in thickness. The material requires incremental applications and a sequence of coating and drying operations which are not readily applicable to complex closely coupled surface configurations of a laser pumping cavity design.

Examples of a closely coupled laser are set forth in U.S. Pat. No. 3,702,976, which shows various arrangements to form complex geometric surfaces that closely locate flash lamps with respect to laser rods to improve laser pumping efficiency. However, in such closely coupled configurations, the flashlamps are associated with disk laser structures that comprise a plurality of glass laser plates aligned along the longitudinal axis all of which require close tolerance fits to produce a lasing output from the device. The arrangement will permit usage of a large number of flash tubes. However, it does not utilize the concept of diffusive reflection to fully illuminate the lasing components of the device.

U.S. Pat. No. 4,232,276 discloses a laser apparatus including a laser rod of high gain laser material which is optically coupled to flashlamps by a pair of elliptical reflective surfaces for establishing a population inversion in the laser material so as to produce a laser emission therefrom. The reflective surfaces on the elliptical reflectors must be precisely configured and are separately assembled on the outer housing by a procedure that requires precise alignment of the flash tubes, reflectors and laser rods to produce a desired interrelationship therebetween to assure efficient operation of the apparatus.

SUMMARY OF THE PRESENT INVENTION

The principal advantage of the present invention is that it includes a pumping cavity reflector formed of glass ceramic material that can be machined to form precise surfaces that are closely coupled to flashlamp and laser rod components of a laser apparatus and wherein the glass ceramic material is characterized by having substantially perfect diffusivity to fully illuminate the exterior surface of the laser rod without the need for precise alignment of elliptical reflector components in the apparatus or without requiring a plurality of paint application and drying steps to form a diffusivity surface.

One feature of the present invention is that it includes a glass ceramic composition that is of a two phase microstructure that enables the glass ceramic material to be machined to form a wide variety of surfaces in close proximity to flashlamp and laser rod components of laser apparatus. Such machinable ceramic material enables complex surfaces to be formed in ceramics without requiring separate tool mold components for making ceramic reflectors of varying size. Consequently, the desired interior diffusive reflective surfaces of the pumping cavity can be formed on a case to case low cost basis to produce special laser apparatus for given job applications.

Yet another feature of the present invention is that it enables the inner reflective surface of a reflector to be formed as a semicircular surface on side wall interior portions of the reflector that are of a shape conforming to the outer surface of the flash tube structures along the length thereof and which side wall surfaces are joined by intersecting inclined nonelliptical surfaces that intersect at an apex region in close coupled relationship to the outer surface of a flow tube in surrounding relationship to a laser rod to produce a resultant simplified geometry that is easily machinable and yet closely coupled to the flash tube and laser rod components of laser apparatus.

Yet another feature of the present invention is that the reflector is formed of a uniform composition throughout its volume so that photons emitted from flash tube components of the laser apparatus are absorbed from the inner surface thereof to the outer surface thereof through a volume that additionally reduces the coolant flow space dimensions between the outer surface of the reflector and the inner surface of an outer surrounding water jacket for flow of coolant that has previously passed with respect to the laser rod and flash tube components of the apparatus so as to efficiently remove energy absorbed by the reflector by diffusion of flash tube photons throughout the total volume of the reflector during operation of the laser apparatus.

Other features and advantages of the present invention will become more apparent upon consideration of the following specification when taken in conjunction with the accompanying drawings wherein:

DESCRIPTION OF THE PREFERRED EMBODIMENT

Figure 1:
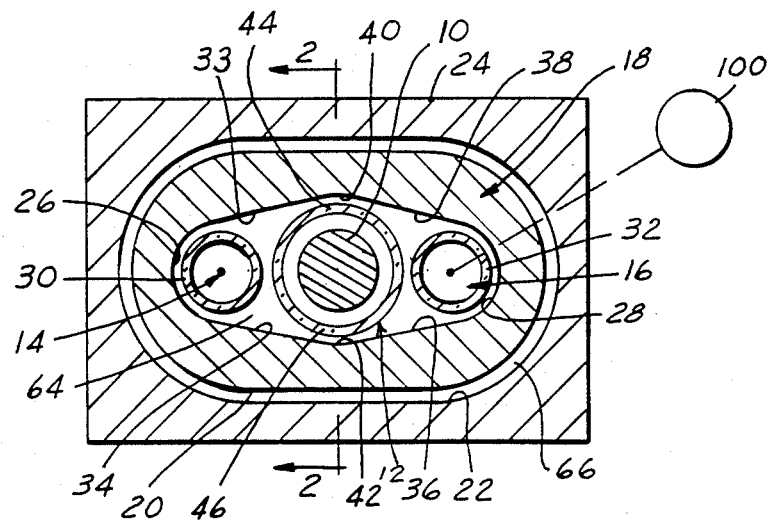
FIG. 1 is a cross sectional view of a laser cavity assembly in accordance with the present invention.
Figure 2:
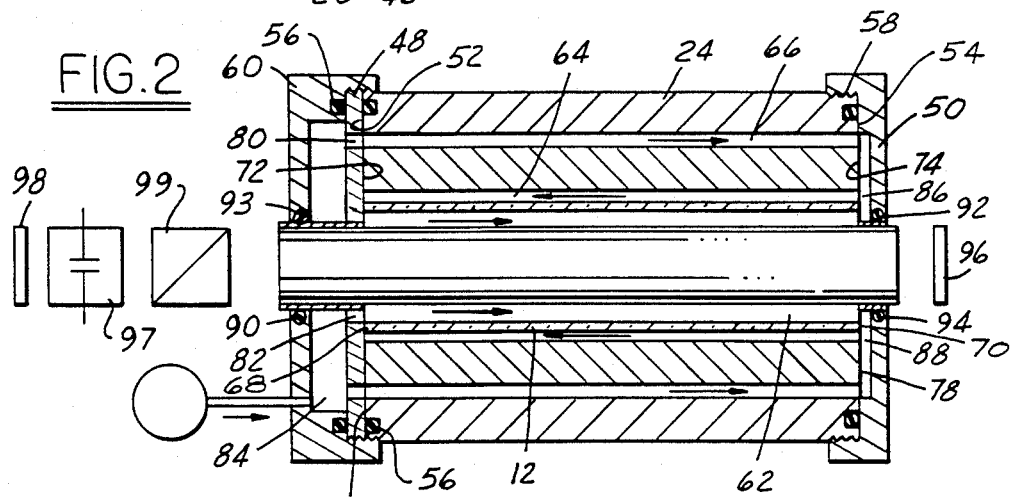
FIG. 2 is a longitudinal cross sectional view of the laser cavity of the present invention.

Referring now to FIG. 1, an embodiment of a laser device is illustrated including a laser rod 10 of neodymium doped yttrium garnet or a Nd:YAG rod. The laser rod forms the center of the cavity. Further, the cavity contains, from the center as defined by the laser rod 10 to the periphery, a water flow tube 12 which is in surrounding spaced relationship to the laser rod. Outboard of the water flow tube are located two flashlamps 14, 16. Outboard of the flashlamps and the water flow tube is a reflector 18 which is formed of glass ceramic material manufactured by Corning Glass Works, Corning, N.Y., and sold under the trademark Macor. As shown in FIGS. 1 and 2 the reflector 18 is formed as a single, self-supporting member. The reflector 18 furthermore is formed from a block of diffusion reflecting material as will be discussed. In accordance with certain principles of the present invention, the reflector 18 is formed of Macor ceramic material throughout its volume. It includes an outer surface 20 located in close spaced relationship to the inner surface 22 of an external water cooling jacket 24. The reflector 18 more particularly includes a pair of hemispherically configured interior side walls 26, 28 that are located in close surrounding relationship to the cylindrical surface 30, 32 of each of the flashlamps 14, 16. Each of the hemispherically configured side walls 26, 28 are joined, respectively, to a pair of inclined surfaces 33, 34 and 36, 38. The inclined surfaces 33, 34 are tangent to the side wall 26 and they diverge apart from one another. Likewise, inclined surfaces 36, 38 are tangent to the side wall 28 and they diverge apart from one another. The divergent surfaces 33, 38 and 34, 36 are intersected, respectively, in longitudinal lines 40, 42 located in close spaced relationship to diametrically opposite points 44, 46 on the outer circumference of the flow tube 12. The resultant geometry defines an inner surface on the reflector 18 that is closely coupled to both the flashlamps 14 and 16 and to the laser rod 10.

The closely coupled reflector 18 extends throughout the length of the flashlamps 14, 16. The external cooling jacket 24 is sealed by end caps 48, 50 which are joined along the ends 52, 4 of the cooling jacket 24 by O-ring seals 56, 58 as best shown in FIG. 2.

The end cap 48 is joined to a water manifold 60 which supplies coolant to the laser apparatus. The end caps 48, 50 are configured to direct cooling water from the manifold 60 into the interior of the flow tube 12 which defines a first water flow channel 62 in surrounding relationship to the outer surface of the laser rod 10. Channel 62 is in parallel with a second flow channel 64 that is formed between the reflector 18 and the outer surfaces of each of the flashlamps 14, 16. The apparatus further includes an outer flow channel 66 which is formed between the outer water jacket 24 and the outer surface 20 of the reflector 18.

The water flow channels 66 and 62 are in parallel and receive water from the manifold 60. The inlet water is directed in parallel through the channels 62, 66. The parallel flows are joined at the back end cap 50 by passages 86, 88 therein that redirect combined flow in a serial fashion back through the flow channel 64 formed by the cavity between the flashlamps 14, 16 and the reflector. The combined return flow cools the lamps and the interior of the reflector as a serial cooling flow path. The return flow is directed through suitable passages (not shown) back to a return port from the apparatus.

The volume of the channel 64 is designed as small as possible while the flow tube around the rod is selected to have a relatively large i.d. so as to decrease the effective flow area through the channel 64. The increase in diameter of the flow tube 12 is made possible by the fact that the reflector 18 is a solid ceramic glass piece that has full diffusivity throughout the mass of the reflector body so that it will fully illuminate all parts of the exterior surface of the laser rod during laser operation. The combination of the parallel flow through the channels 62 and 66 and the serial return through the channel 64 produces a reduced pressure around the lamps and, consequently, the major pressure drop in the system is determined by the manifold which can be independently tailored to produce a minimum total pressure drop for a particular laser apparatus. The laser cavity reflector shape is not a pressure-drop design constraint and is thus adaptable to a wide range of applications that can be efficiently operated to dissipate heat generated during the lasing operation while retaining excellent optical efficiency because of the close coupling of the diffuse reflector 18 with the flashlamps 14, 16.

The flow tube 12 and the reflector 18 each have opposite ends thereof formed perpendicular to the longitudinal axis thereof as shown in FIG. 2. Each of the opposite ends engages one of the end caps 48, 50. This end configuration eliminates the need for separate seal elements for sealing such ends with respect to the end caps 48, 50. Rather, the ends 68, 70 of the tube 12 are snugly engaged with the inner surface 72, 74 of the end caps 48, 50. Likewise, the end 76, 78 of the reflector are snugly fit against the same surfaces. This snug fit is sufficient to form the respective water flow channels 62 and 64 inboard of the laser cavity. The end caps 48, 50 include flow ports 80, 82 that direct coolant from the manifold cavity 84 for parallel flow through the water flow channels 62 and 64. These channels are respectively communicated back to the channel 64 by passages 86, 88 formed in the end wall 50. The laser rod 10 is held in place by two stainless steel holders 90, 92. The stainless steel holders are in the form of cylinders that grip the opposite ends of the laser rod 10. They in turn are supported by the end caps 48, 50 and are sealed with respect thereto by O-ring seals 92, 94 located respectively in the end cap 48 and end cap 50. The holders 90, 92 define light paths to known external laser path components such as reflectors 96, 98 and a Q switch comprising a Kerr cell 97 and a polarizer 99.

The flashlamps 14, 16 more particularly are either cerium doped lamps or are either of the Krypton or xenon type. They are connected to a suitable power source 100 that when operated at a desired power level will match the emission of the flash tube to the absorption characteristics of the Nd:YAG type laser rod 10. The ultraviolet light emissions from the flashlamps 14, 16 are blocked by the flow tube 12. The flow tube is transparent to visible light and since it is opaque to short ultraviolet light it can prevent absorption of light by the rod that can produce solarization or color centers in the Nd:YAG laser rod which might irreversibly decrease its efficiency. In one working embodiment the flow tube is formed of a composition of borosilicate glass, Pyrex or samarium doped glass. The samarium doped material of the flow tube will absorb ultraviolet light and re-emit it as visible light through fluorescence in a manner similar to cerium doped material.

Figure 3:
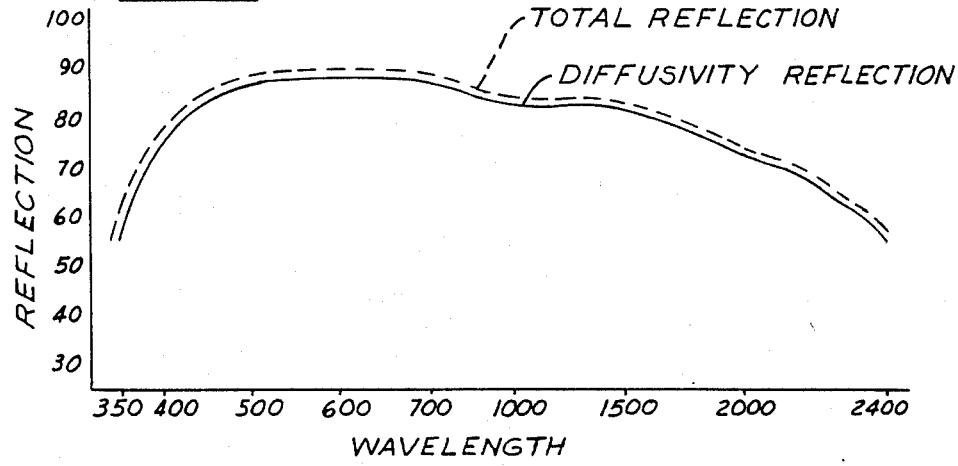
FIG. 3 is a graph of the spectral data of the reflector of the present invention.

The Macor ceramic material reflector 18 has a diffusive reflectance which is shown in FIG. 3 as being substantially 100% diffusive reflectivity through a spectral range of from 450 to 900 nm microwave length. The material has a high reflectance in the full spectral range. Furthermore, almost 100% of the reflectivity is of a diffusive type which will assure uniform illumination of the rod throughout its length and from all sides. This uniform illumination is obtained even though closely coupled reflector surfaces are used in conjunction with the flashlamps and the laser tube. This enables a reduced flow area for coolant which will increase the level of coolant turbulence. The increased turbulence, the use of cerium doped lamps and the use of peak power supplied by the power source 100 in the range of 600 joules at 20 Hz, all combine to produce an unexpectedly improved efficiency on the order of 4.2% at maximum power input from the flashlamps 14, 16. Because of the closely coupled reflector surfaces and the use of a large diameter flow tube 12, each of the cooling channels 62, 64 and 66 have water flows in a turbulent regime. The heat absorption into the reflector 18 is dissipated by the water flow through the outer flow channel 66. The thermal conductivity of Macor ceramic material is approximately one order of magnitude lower than alumina based ceramics. Consequently it is necessary to provide the series flow cooling of both the inside and outside surfaces of the reflector 18. The reflector 18 is further characterized as shown in FIG. 3 as having relatively high absorption of ultraviolet wave lengths and a low reflectivity in the infrared region which will reduce the thermal loading of the laser rod 10.

As previously stated, Macor is a two phase microstructure of approximately 55% crystal and 45% residual glass. The composition is mica based, and because of its two phase microstructure can be machined to define a wide range of interior surfaces on the reflector so that it can be located in closely spaced relationship to the flash tube and laser rod components of the laser apparatus. To repeat, good thermal cooling characteristics are obtained because of the reduced spaces for turbulent water flow through the cavity. In the illustrated embodiment, the glass ceramic reflector 18 has a mass and configuration to absorb 30% of the thermal load distribution at maximum power input to the pumping cavity. The 100% diffusive reflectivity serves to optically couple the flash lamp 14, 16 to the laser rod 10 for emitting pumping radiation which will establish the desired population inversion in the laser material between a pair of energy levels such that the laser rod 10 will emit laser radiation at a lasing wave length corresponding to the energy difference therebetween. The fact that the Macor ceramic material is readily machinable eliminates use of high cost mold tooling in the manufacture of special laser apparatus matched to given conditions of a job application for the laser.

What is claimed is:

1. In a laser pumping cavity, a laser rod of high gain material; a light source having an outer surface located in spaced parallel relationship to the laser rod to direct pumping radiation thereto and selectively energizable for emitting pumping radiation to establish a population inversion in the laser rod between first and second energy levels to cause laser light radiation therefrom and including a coolant flow tube for directing symmetrical water flow around the laser rod for cooling it during its operation, the improvement comprising:

a hollow single piece solid member of reflective glass ceramic material having an outer surface and an inner surface thereon spaced from the coolant flow tube and said hollow single piece solid member enclosing both the light source and the coolant flow tube to serve as the sole reflector surface for focusing light from the light source to the laser rod;

said hollow single piece solid member having the inner surface thereof located in spaced relationship with the outer surface of the light source to closely couple the reflective glass ceramic material to the light source; and said hollow single piece solid member of ceramic material receiving light from said light source and reflecting light to said laser rod at a reflectance from said inner surface which is substantially equal to the combined diffusivity reflection of said hollow single piece solid member from said inner surface to said outer surface thereof.

2. In the combination of claim 1, said inner surface and said glass ceramic outer surface having a reflectance from said glass ceramic outer surface thereof to produce a diffusivity reflectance which is substantially 100% of the total reflection from said inner surface in a spectral range of 450 to 900 nm and a relatively high absorption of ultraviolet wave lengths so as to reduce thermal loading in the laser rod.

3. In the combination of claim 1, said glass ceramic material being a mica based material having a composition of approximately 55% crystalline material and 45% residual glass thereby to define a two phase microstructure that is machinable to form the inner surface configurations of said single piece solid member.

4. In the combination of claim 1, said light source being a flashlamp having an envelope material of cerium doped fused silica for absorbing short ultraviolet lamp emissions and re-emitting them through fluorescence in the energy absorption bands of the laser rod; said flow tube being transparent to visible light and opaque to short ultraviolet light thereby to minimize formation of color centers in said laser rod.

5. In the combination of claim 4, said flow tube being formed of borosilicate glass.

6. In the combination of claim 1, said hollow single piece solid member including means for absorbing 30% of the thermal load distribution at maximum input power of the pumping cavity.

7. In the combination of claim 2, said glass ceramic material being a mica based member having a composition of approximately 55% crystalline material and 45% residual glass thereby to define a two phase microstructure that is machinable to form the inner surface configurations of the pumping cavity reflector.

8. In the combination of claim 2, said light source being a lamp having an envelope material of cerium doped fused silica for absorbing short ultraviolet lamp emissions and re-emitting them through fluorescence in the energy absorption bands of the laser rod; said flow tube being transparent to visible light and opaque to short ultraviolet light thereby to minimize formation of color centers in said laser rod.

9. In the combination of claim 8, said flow tube being formed of borosilicate glass.

10. In the combination of claim 2, said hollow single piece solid member including means for absorbing 30% of the thermal load distribution of the pumping cavity at maximum input power to the pumping cavity.

11. In the laser pumping cavity of claim 1, said glass ceramic material having a thermal conductivity at least ten times lower than alumina based ceramics;

and means defining a series coolant flow system for directing coolant directly against the inner and outer surfaces of said hollow single piece solid member to extract heat build-up therefrom.

12. In the laser pumping cavity of claim 11, said means for defining a series coolant flow system including an outer housing with an inner surface and said hollow single piece solid glass ceramic member having an outer surface thereon located in spaced relationship thereto define a first coolant flow path from end to end of said outer surface and directly in contact with said outer surface for recovering heat therefrom without heat passage through an intervening medium;

said series coolant flow system further including said inner surface of said hollow single piece solid member which directly passes coolant flowing thereacross in an opposite direction to said first coolant flow path for recovering heat from said hollow single piece solid member ceramic material without heat passage through an intervening medium.

13. A unitary hollow single piece reflector for use in a laser apparatus including a laser rod and a light source located in spaced parallel relationship to the laser rod to direct pumping radiation thereto, said unitary hollow single piece reflector comprising a solid casting of fused glass ceramic material having first and second opposite ends, an outer surface and an inner surface defining a core through said solid casting from one end to the opposite end thereof;

said core enclosing a laser rod and a light source;

said inner surface located in close spaced relationship with the light source, and said fused glass ceramic material between said inner surface and said outer surface reflecting light from the light source by direct reflection and by diffusivity reflection produced from the inner surface and the full depth of the hollow single piece solid member from the inner to outer surfaces thereof.

14. In the reflector member of claim 13, said glass ceramic material between said inner surface and said outer surface having reflectance from the inner surface to the outer surface thereof to produce a diffusivity reflectance which is substantially 100% of the total reflection from said inner surface in a spectral range of 450 to 900 nm and a relatively high absorption of ultraviolet wave lengths so as to reduce thermal loading in the laser rod.

15. In the reflector member of claim 14, said glass ceramic material being a mica based material having a composition of approximately 55% crystalline material and 45% residual glass thereby to define a two phase microstructure that is machinable to form the inner surface configuration of said core.

* * * * *